(12) United States Patent
Kojima et al.

(10) Patent No.: US 9,654,491 B2
(45) Date of Patent: May 16, 2017

(54) NETWORK FILTERING APPARATUS AND FILTERING METHOD

(71) Applicant: FUJITSU LIMITED, Kawasaki-shi, Kanagawa (JP)

(72) Inventors: Hisashi Kojima, Yokosuka (JP); Masahiro Nakada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/680,410

(22) Filed: Apr. 7, 2015

(65) Prior Publication Data

US 2015/0215333 A1 Jul. 30, 2015

Related U.S. Application Data

(63) Continuation of application No. PCT/JP2012/079434, filed on Nov. 13, 2012.

(51) Int. Cl.
*H04L 29/06* (2006.01)
*H04L 12/64* (2006.01)

(52) U.S. Cl.
CPC ...... *H04L 63/1433* (2013.01); *H04L 12/6418* (2013.01); *H04L 63/0227* (2013.01); *H04L 63/0245* (2013.01)

(58) Field of Classification Search
CPC .................... G06F 21/577; G06F 21/55–21/57
USPC ...................................................... 726/22–25
See application file for complete search history.

(56) References Cited

U.S. PATENT DOCUMENTS

| 8,127,358 B1 * | 2/2012 | Lee ...................... G06F 21/564 726/22 |
| 2003/0212757 A1 | 11/2003 | Niikura et al. |
| 2004/0111519 A1 | 6/2004 | Fu et al. |
| 2010/0083240 A1 | 4/2010 | Siman |
| 2010/0268721 A1 * | 10/2010 | Kitano .................. G06F 3/0237 707/758 |

FOREIGN PATENT DOCUMENTS

| JP | 6-35857 | 2/1994 |
| JP | 2003-323383 | 11/2003 |
| JP | 2004-185622 | 7/2004 |
| JP | 2007-157059 | 6/2007 |

(Continued)

OTHER PUBLICATIONS

International Search Report mailed on Apr. 2, 2013 in corresponding International Patent Application No. PCT/JP2012/079434.

(Continued)

*Primary Examiner* — Anthony Brown
(74) *Attorney, Agent, or Firm* — Staas & Halsey LLP

(57) ABSTRACT

An apparatus filters data received through a network and outputs the filtered data to a protection target device. The apparatus includes a processor to execute a process including: comparing the received data with a predetermined pattern and outputting a result of comparison, the predetermined pattern being one of a plurality of patterns that are given to a test device configured to estimate a behavior of the protection target device, the target device exhibiting a predetermined behavior to the predetermined pattern; and intercepting the received data when the result of comparison is a positive result that indicates intercepting the data.

17 Claims, 10 Drawing Sheets

(56) References Cited

FOREIGN PATENT DOCUMENTS

| | | |
|---|---|---|
| JP | 2010-507165 | 3/2010 |
| WO | WO 2012/011270 | 1/2012 |
| WO | WO 2012/063493 | 5/2012 |

OTHER PUBLICATIONS

Written Opinion of the International Searching Authority mailed Apr. 2, 2013 in corresponding International Application No. PCT/JP2012/079434.
International Patent Publication Bibliographic data, Publication No. WO 2008/047351 A3, published Apr. 24, 2008, corresponding to AA and AD.
Patent Abstracts of Japan, Publication No. 06-035857, published Feb. 10, 1994.
Patent Abstracts of Japan, Publication No. 2003-323383, published Nov. 14, 2003.
Patent Abstracts of Japan, Publication No. 2007-157059, published Jun. 21, 2007.
Patent Abstracts of Japan, Publication No. 2004-185622, published Jul. 2, 2004.

* cited by examiner

FIG.2A

```
GET / HTTP/1.1
Host: 192.168.1.10
Accept: text/html
Accept-Language: ja
User-Agent: Any browser 1.0
```
~200

NORMAL PATTERN

FIG.2B

```
GET / HTTP/1.1
Host: xxx…xxx          ←215
Accept: text/html
Accept-Language: ja
User-Agent: Any browser 1.0
```
~210

TEST PATTERN 1

FIG.2C

```
GET / HTTP/1.1
Host: 192.168.1.10
Accept: xxx…xxx        ←225
Accept-Language: ja
User-Agent: Any browser 1.0
```
~220

TEST PATTERN 2

FIG.2D

```
GET / HTTP/1.1
Host: 192.168.1.10
Accept: text/html
Accept-Language: xxx…xxx   ←235
User-Agent: Any browser 1.0
```
~230

TEST PATTERN 3

FIG.2E

```
GET / HTTP/1.1
Host: 192.168.1.10
Accept: text/html
Accept-Language: ja
User-Agent: xxx…xxx    ←245
```
~240

TEST PATTERN 4

| IP ADDRESS OF PROTECTION TARGET DEVICE | 192.168.1.10 |
| --- | --- |
| PORT NUMBER OF PROTECTION TARGET DEVICE | 80 |
| APPLICATION OF PROTECTION TARGET DEVICE | BUSINESS PROGRAM 1 |
| TEST METHOD | TEST 1 |
| NORMAL PATTERN OF TEST 1 | SAVING ADDRESS OF NORMAL PATTERN |
| TOTAL NUMBER OF TEST 1 | 4 |
| NUMBER OF PATTERN TO BE TESTED SUBSEQUENT TO TEST 1 | 1 |

FIG.6

| TEST NUMBER | TEST METHOD | NORMAL PATTERN OF TEST 1 | PATTERN INFORMATION OF TEST 1 |
|---|---|---|---|
| 1 | TEST 1 | STORING ADDRESS OF NORMAL PATTERN | STORING ADDRESS OF PATTERN 1 |
| 2 | TEST 1 | STORING ADDRESS OF NORMAL PATTERN | STORING ADDRESS OF PATTERN 2 |
| ... | ... | ... | ... |

600

NETWORK FILTERING APPARATUS AND FILTERING METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/079434 filed on Nov. 13, 2012, designating the U.S., the entire contents of the foregoing application are incorporated herein by reference.

FIELD

The embodiments discussed herein are directed to a technique of filtering data transmitted through a network.

BACKGROUND

In recent years, a method of black box security test that is referred to as the "Fuzz testing" has become widely used. The Fuzz testing tool detects vulnerability by applying a large amount of various kinds of test data, which are considered to be effective for detecting vulnerability, to a product to be tested. For example, attempts to find an unknown vulnerability, such as a buffer overflow, an integer overflow, etc., are taken using the Fuzz testing tool. In recent years, the Fuzz testing tool has been allowed for use for any person, which may permit a malicious person to easily find an unknown vulnerability.

It is ideal to take a firm security countermeasure for a product to be connected to a network against attacks from the network at a point of sales. However, in many cases, a vulnerability of a product may be newly found after the product is sold and transferred to a consumer. Such a product may include many component parts. Among these component parts, there may be a black box module of which interior cannot be checked easily. That is, the black box module includes a source code that cannot be inspected. Additionally, there may be a vulnerability that can be found only after the sold product is incorporated into the system of the purchaser. Further, if a vulnerability is found in the sold product, it takes a time to distribute the updated software to take a countermeasure against the vulnerability.

Thus, it is an urgent need to take a countermeasure against an unknown vulnerability of a product. Conventionally, there exists a technique to detect a vulnerability at an application program level by automatically scanning a source code of the application program (for example, refer to Japanese Laid-Open Patent Application No. 2010-507165).

Additionally, there exists a technique to take an analysis of the cause of occurrence of an abnormality and a countermeasure process for recovery by successively accumulating and displaying abnormal ending operation data generated during the operation of the application (for example, refer to Japanese Laid-Open Patent Application No. H6-35857).

Further, there exists a communication device capable of communicating with a server connected through a network that determines, when a mail message is received from the POPS server, whether the mail message contains an error, and registers a unique ID of the mail message determined as containing an error, and rejecting the reception of the mail message having a mail message number the same as the mail message having the registered unique ID (for example, refer to Japanese Laid-Open Patent Application No. 2003-323383).

SUMMARY

There is provided according to an aspect of the embodiments an apparatus configured to filter data received through a network and output the data to a protection target device, the apparatus including a processor to execute a process including: comparing the received data with a predetermined pattern and outputs a result of comparison, the predetermined pattern being one of a plurality of patterns that are given to a test device configured to estimate a behavior of the protection target device, the target device exhibiting a predetermined behavior to the predetermined pattern; and intercepting the received data when the result of comparison is a positive result that indicates intercepting the data.

There is provided according to another aspect of the embodiments a non-transitory computer-readable storage medium having stored therein a program for causing a computer to execute a process of filtering data received through a network and outputting the data to a protection target device, the process including: comparing the received data with a predetermined pattern and outputting a result of comparison, the predetermined pattern being one of a plurality of patterns that are given to a test device configured to estimate a behavior of the protection target device, the target device exhibiting a predetermined behavior to the predetermined pattern; and intercepting the received data when the result of comparison is a positive result that indicates intercepting the data.

There is provided according to a further aspect of the embodiments a method of filtering data received through a network and outputting the data to a protection target device, the method including: comparing the received data with a predetermined pattern and outputting a result of comparison, the predetermined pattern being one of a plurality of patterns that are given to a test device configured to estimate a behavior of the protection target device, the target device exhibiting a predetermined behavior to the predetermined pattern; and intercepting the received data when the result of comparison is a positive result that indicates intercepting the data.

There is provided according to yet another aspect of the invention a system configured to filter data received through a network and output the data to a protection target device, the system including one or more processors to execute a process including: creating data of a plurality of patterns; transmitting the created data of each of the patterns to a test device that is configured to estimate a behavior of the protection target device; detecting an abnormality in the behavior of the test device; specifying the predetermined pattern that causes the abnormality in the behavior of the test device when the abnormality in the behavior of the test device is detected; outputting a result of comparison of the received data with the predetermined pattern; and intercepting the received data when the result of comparison is a positive result that means that the data is to be intercepted.

BRIEF DESCRIPTION OF DRAWINGS

FIG. 2A is an illustration of a normal pattern of a header part of the HTTP protocol;

FIGS. 2B-2E are illustrations of test patterns for checking buffer overflow;

FIG. 6 is an illustration of a list used for saving a pattern in which an abnormality is specified;

DESCRIPTION OF EMBODIMENT(s)

A description will now be given, with reference to the drawings, of embodiments.

Figure 1:
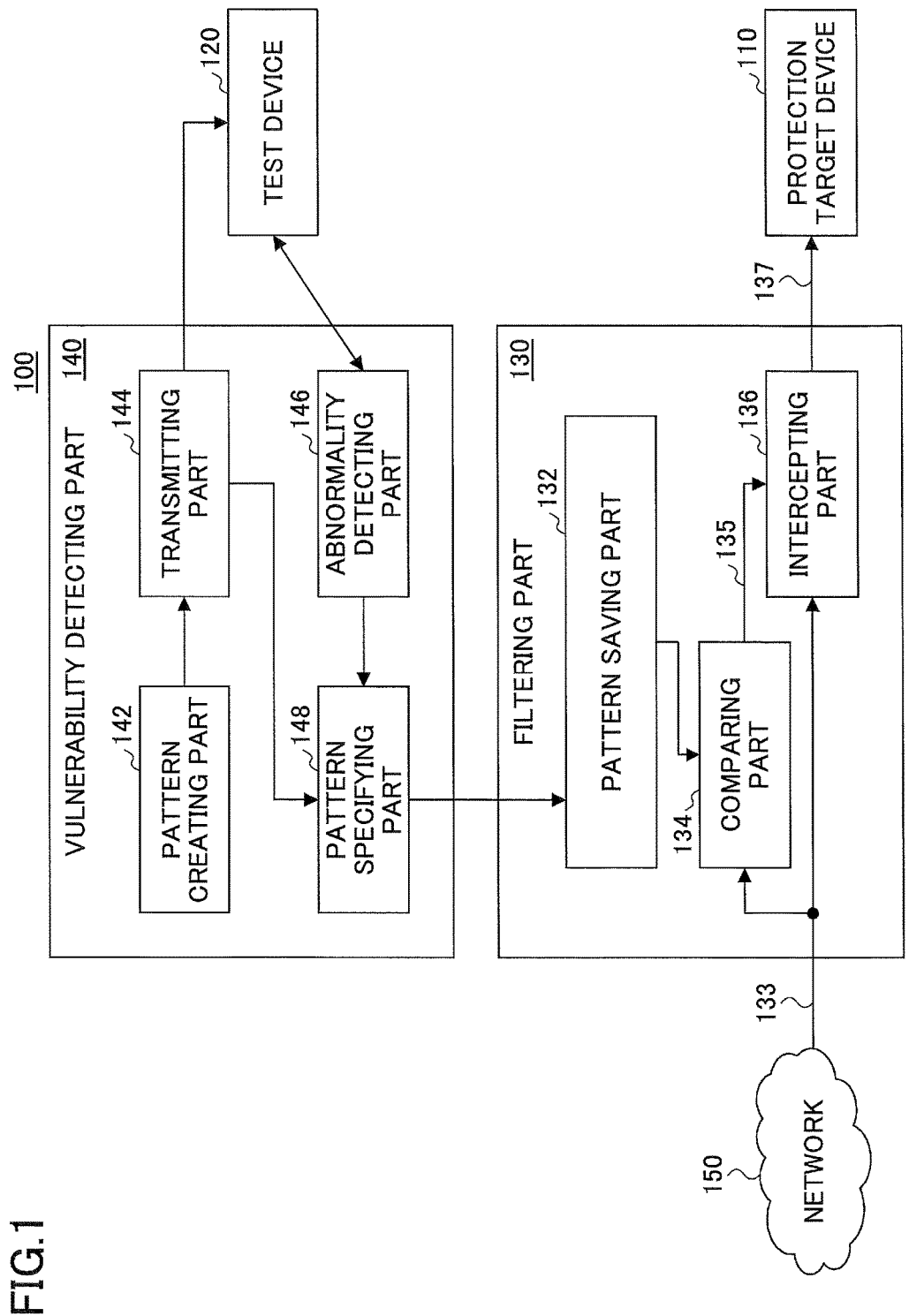
FIG. 1 is a block diagram of a filtering system according to an embodiment.

FIG. 1 is a block diagram of a filtering system 100 according to an embodiment. In FIG. 1, a device 110 to be protected (hereinafter, referred to as the "protection target device 110") is connected to an external network 150 through the filtering part 130. The filtering part 130 filters data transmitted from the network 150 to the protection target device 110. The filtering intercepts the transmission of data that involves risks to the vulnerability of the protection target device 110.

The filtering part 130 may be connected to a vulnerability detecting part 140. The vulnerability detecting part 140 may be connected to a test device 120.

The filtering part 130 and the vulnerability detecting part 140 may be physically separated from each other. The filtering part 130 and the vulnerability detecting part 140 may be located any places.

The protection target device 110 may be any devices that can be connected to a network. As a specific example of the protection target device 110, there are a server, personal computer, hand-held computer, game equipment, television, home appliance, navigation system, cellular phone, etc.

The filtering part 130 ma include a pattern saving part 132, a comparing part 134 and an intercepting part 136. A series of packets are transmitted from the network 150 to the filtering part 130 through a transmission path 133. The comparing part 134 may compare each of the transmitted packets with a plurality of patterns saved in the pattern saving part 132. The unit of comparison is not limited to the packet. The format of the data transmitted through the transmission path 133 may be any formats other than a packet. The comparing part 134 may compare a part of the data transmitted through the transmission path 133 with the patterns saved in the pattern saving part 132. Alternatively, when the data transmitted through the transmission path 133 is converted by compression or the like, the comparing part 134 may set the reverse-converted data as an object to be compared. The comparison in the comparing part 134 may not be a comparison of complete coincidence. For example, the comparison may be a determination as to whether the data falls within a fixed numerical range or whether a length of bits of the data falls within a predetermined range using one or more threshold values. Accordingly, the comparison may be a result of determination including a range of similarity by setting a margin to the above-mentioned comparison. The comparing part 134 may outputs a positive result or a negative result according to the result of comparison. The comparison may be performed to determine whether the sequence of the data conforms to a predetermined rule.

The pattern saving part 132 may store, but not limited to, a predetermined series of bits. For example, a pattern as a rule other than a pattern of a mere string of data may be saved. For example, a length of series of bits of a parameter value, a range of the parameter value, etc., may be saved as a pattern of a rule. The pattern may include information such as information regarding a port number to the protection target device 110, information regarding an application of the protection target device 110 that uses the data, etc. The comparing part 134 may compare or determine the data transmitted through the transmission path 133, and may output a positive result or a negative result as a result of the determination to the intercepting part 136 through a transmission path 135. In the description, the positive result of the comparing part 134 means that the data and the pattern conform to a predetermined rule and the data should be intercepted by the intercepting part 136. The negative result indicates the reverse meaning that the data should be passed through the intercepting part 136.

The intercepting part 136 is located between the network 150 and the protection target device 110 so that the intercepting part 136 can filter the data supplied from the network 150 to the protection target device 110. The data supplied from the network 150 to the protection target device 110 may be passed through the intercepting part 136 as it is. The intercepting part 136 inputs data from the transmission path 133, and transmits the data from which predetermined data is removed to the protection target device 110 through the transmission path 135. The intercepting part 136 receives control information from the comparing part 134 through the transmission path 135. When the transmitted data is separated into packets, the intercepting part 136 may buffer the receive packets. Then, the intercepting part 136 may wait for the control signal sent from the comparing part 134 through the transmission path 135 to determine whether to intercept the buffered packets or cause the buffered packets to pass through. The intercepted packets may be discarded. Alternatively, the intercepting part 136 may buffer the data being subjected to the comparison by the comparing part 134. Then, the intercepting part 136 may wait for the control signal sent from the comparing part 134 through the transmission path 135 to determine whether to intercept the buffered packets or cause the buffered packets to pass through.

The test device 120 connected to the vulnerability detecting device 140 may be a device to simulate the behavior of the protection target device 110. The test device 120 may use a product having the same specification with the protection target device 110. If the protection target device 110 is a server, it is desirous to be a server having the same specification and mounted with the same software. The protection target device 110 may be used as the test device as it is (this point will be mentioned later with reference to FIG. 7). The test device 120 may have, for example, a console port connected to an abnormality detecting part 146 in order to check the behavior. Additionally, in order to monitor the behavior of the software, the software may be operated on a virtual machine to monitor the software by a firmware of the virtual machine, and the monitor output may be sent to the abnormality detecting part 146.

The vulnerability detecting part 140 may include a pattern creating part, transmitting part 144, abnormality detecting part 146 and pattern specifying part 148.

The pattern creating part 142 may create data of various patterns. Examples of the pattern are described later. When the data is transmitted in the form of packet, the packet may be created. The pattern creating part 142 may create data to which a predetermined process has been applied. Examples of the created pattern are mentioned later with reference to FIG. 2.

The transmitting part 144 transmits the data having a pattern created by the pattern creating part 142 to the test device 120.

The abnormality detecting part 146 monitors the behavior of the test device 120. The monitoring of the behavior may be performed each time a single pattern is sent to the test device 120. The abnormality detecting part 146 may check whether the test device 120 is operated normally or the operation of the test device 120 has ended abnormally. As the monitoring of the behavior of the test device 120, for example, the character string information output from the console port of the test device 120 may be monitored. For example, the server may perform an abnormality notification display at the console port of the server to notify of an abnormality of the server. The abnormality detecting part 146 may capture the data relating to the display to detect the abnormality of the server. Alternatively, a packet for checking life or death (Ping or the like) is sent from the abnormality detecting part 146 to the test device 120 to check whether a return is sent back. For example, when the operation of the test device 120 is ended abnormally or hung up, there may be a case where a return for Ping is not performed. Thus, an abnormality of the test device 120 can be checked by checking the return for the Ping.

Additionally, in order to monitor the behavior of the software on the test device 120, the test device 120 may be structured on a virtual machine. Then, the focused software may be operated on the test device 120 and the behavior of the test device 120 may be monitored by the firmware of the virtual machine, and a result of the monitoring may be sent to the abnormality detecting part 146.

The pattern specifying part 148 specifies a pattern that causes an abnormality. When an abnormality is detected by the abnormality detecting part 146, information regarding the abnormality is transmitted to the pattern specifying part 148. Thus, a pattern that is sent immediately before the transmission can be specified by the pattern specifying part 148.

The pattern specifying part 148 may specify the pattern that causes the abnormality, and may send the specified pattern to the pattern saving part 132. The pattern specifying part 148 may specify not the data of the pattern itself but a length of the pattern (bit length) as a pattern, and may send the specified pattern to the pattern saving part 132. Additionally, the pattern specifying part may provide the pattern and the used port number or information that specifies the application by relating to the pattern to the pattern saving part 132.

As mentioned above, the filtering part 130 and the vulnerability detecting part 140 together operate by cooperating with each other.

Thus, a new vulnerability existing inside the protection target device 110 can be found efficiently. Then, the data transmission targeting the vulnerability from the network can be effectively intercepted. Thereby, the protection of the protection target device 110 can be done quickly.

FIGS. 2A through 2E illustrate a normal pattern and test patterns according to the present embodiment. FIGS. 2A through 2E illustrate examples where the protection target device 110 serving as a Web server sends test data (packet) as an HTTP request.

The normal pattern 200 illustrated in FIG. 2A corresponds to a header part of the HTTP protocol. The information is contained in a single packet. The test patterns 1 through 4 (210 through 240) illustrated in FIGS. 2B through 2E are examples of the pattern created by the pattern creating part 142. These test patterns 1 through 4 are created mainly for checking a buffer overflow. Because there are headers of four types, data including consecutive 256 Xs is used for the header of each pattern.

The test pattern 1 (210) illustrated in FIG. 2B contains an address (XXX . . . XXX) of a bit length, which cannot exist in a normal condition. The test pattern 2 (220) illustrated in FIG. 2C contains a parameter (XXX . . . XXX) having a bit length, which cannot exist in a normal condition. The test pattern 3 (230) illustrated in FIG. 2D contains a parameter (XXX . . . XXX) as a language parameter indicating a language used by the receiver side, the parameter having a bit length, which cannot exist in a normal condition. The test pattern 4 (240) illustrated in FIG. 2E contains a parameter (XXX . . . XXX) as a user agent parameter used by the receiver side, the parameter having a bit length, which cannot exist in a normal condition. Null may be used instead of X. A character string longer than the character string of 256 characters may be used.

Figure 3:
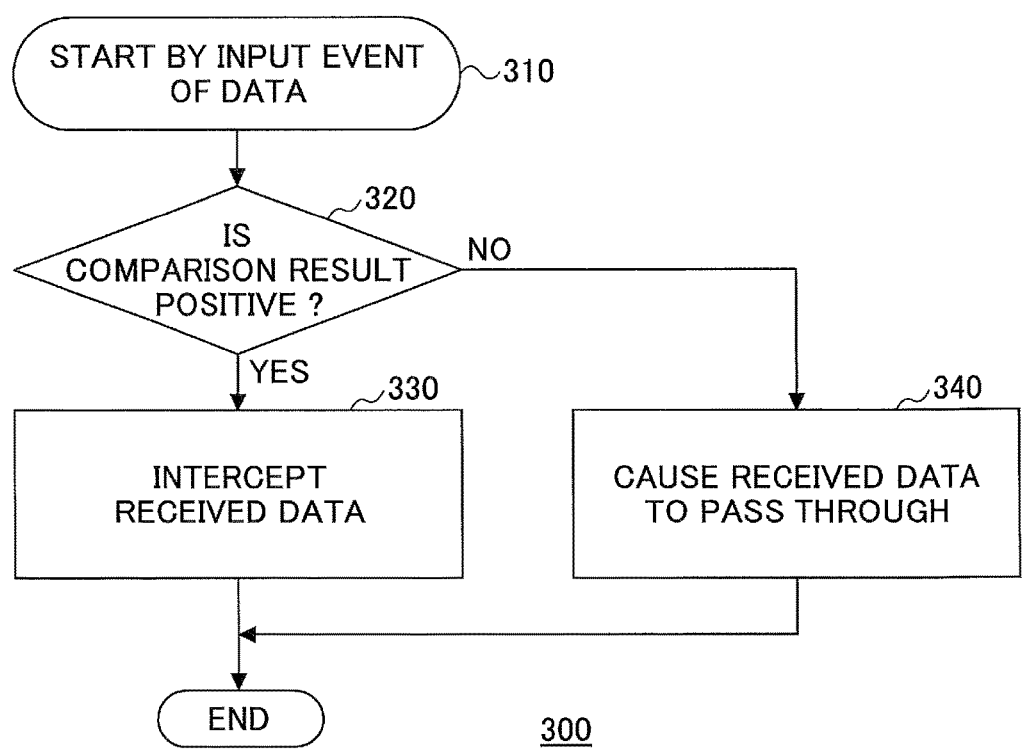
FIG. 3 is a flowchart of a process performed by a comparing part according to the embodiment.

FIG. 3 illustrates a flowchart 300 of a process performed by the comparing part 134 according to the present embodiment. This process may be started by an input event of data (packet) from the network 150 (step 310). For example, the process flow may be performed with respect to each of a plurality of received packets.

In step 320, the pattern saved in the pattern creating part 142 is compared with the data received from the network 150. The comparison may be based on a unit of packet. If the result of the comparison is positive, "YES" is output in step 320. The positive result indicates that the received data (packet) should be intercepted, and the process proceeds to step 330. If the result of the comparison is not positive ("NO"), which means that the received data can be passed through, and the process proceeds to step 340.

In step 330, the intercepting part 136 intercepts the received data (packet). According to the interception, the data that causes an abnormality to the protection target device 110 can be effectively prevented from being transmitted.

In step 340, the intercepting part 136 causes the received data to pass through to transmit the data to the protection target device 110.

Figure 4:
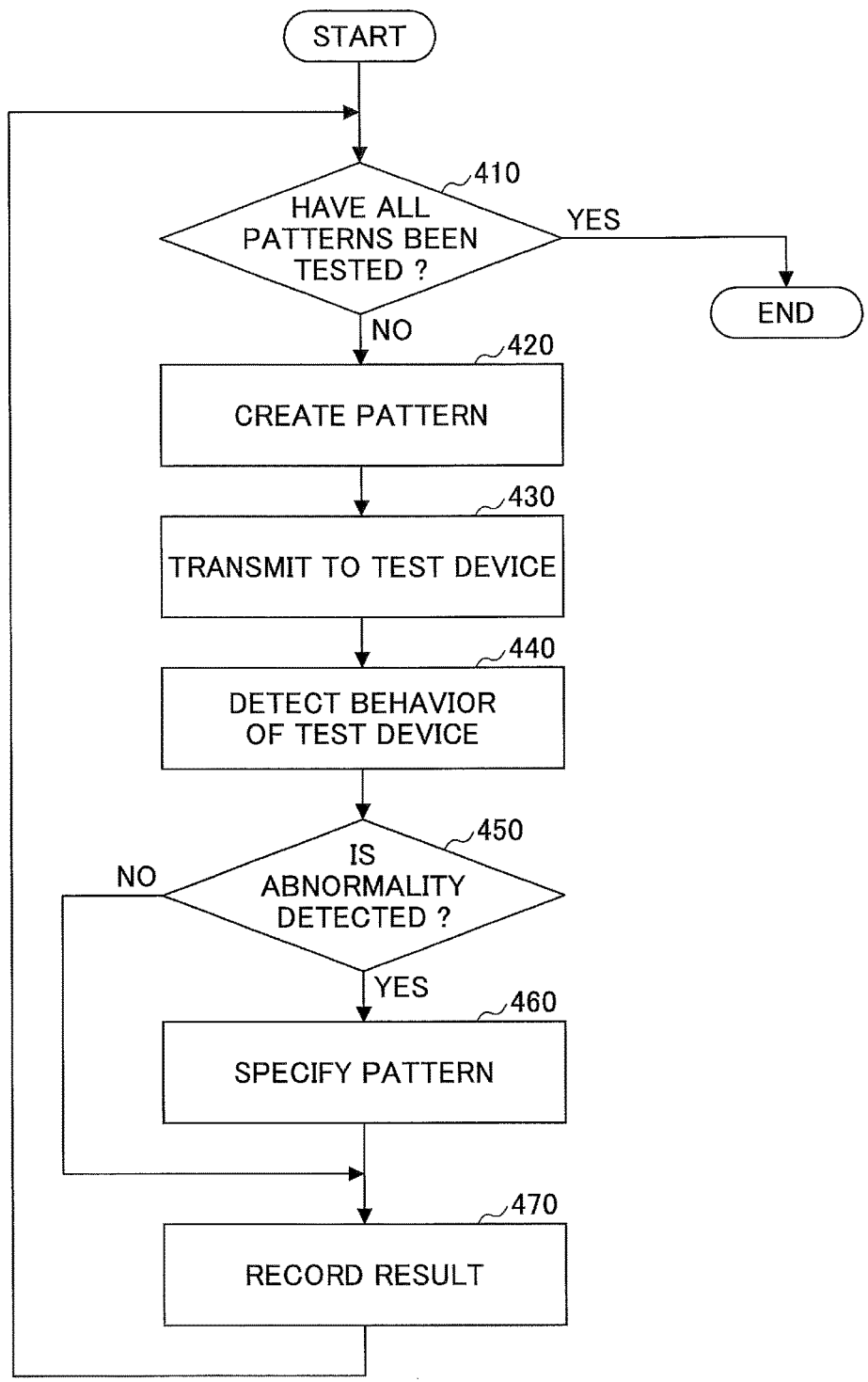
FIG. 4 is a flowchart of a process performed by a vulnerability detecting part according to the embodiment.

FIG. 4 is a flowchart of a process performed by the vulnerability detecting part 140 according to the present embodiment.

In step 410, it is determined whether all patterns have been tested. As illustrated in FIGS. 2B through 2E, there are a plurality of test patterns. Thus, if the test for all patterns is ended, the process of FIG. 3 is ended. If the test for all patterns is not ended, the process proceeds to step 420.

In step 420, a pattern is created by the pattern creating part 142. The pattern may be a single packet.

In step 440, the behavior of the test device 120 is detected by the abnormality detecting part 146. As a method of detecting an abnormality, automatic checking may be performed as to whether there is an abnormality display of the console output of the test device 120 or whether a return according to Ping is received.

In step 450, it is determined whether a predetermined behavior such as, for example, an abnormality is detected. If the result of the determination is "YES", the process proceeds to step 460. If the determination is "NO", the process proceeds to step 470.

In step 460, the pattern that causes the abnormality in the test device 120 is specified. A notice of the specified pattern may be given to the pattern saving part 132.

In step 480, the check result may be recorded. According to the records, a progress management for the test applied to the test device 120 may be performed. Additionally, a management of vulnerability of the protection target device 110 may be performed according to the records. Alternatively, for example, a version upgrade of an application program existing inside the protection target device 110 may be performed based on the records. If the version upgrade is performed and the vulnerability of the protection target device 110 is improved, the unnecessary pattern for which the vulnerability has been improved may be deleted from the patterns saved in the pattern saving part 132 based on the information regarding the improvement in the vulnerability (not illustrated in the figure).

Figure 5:
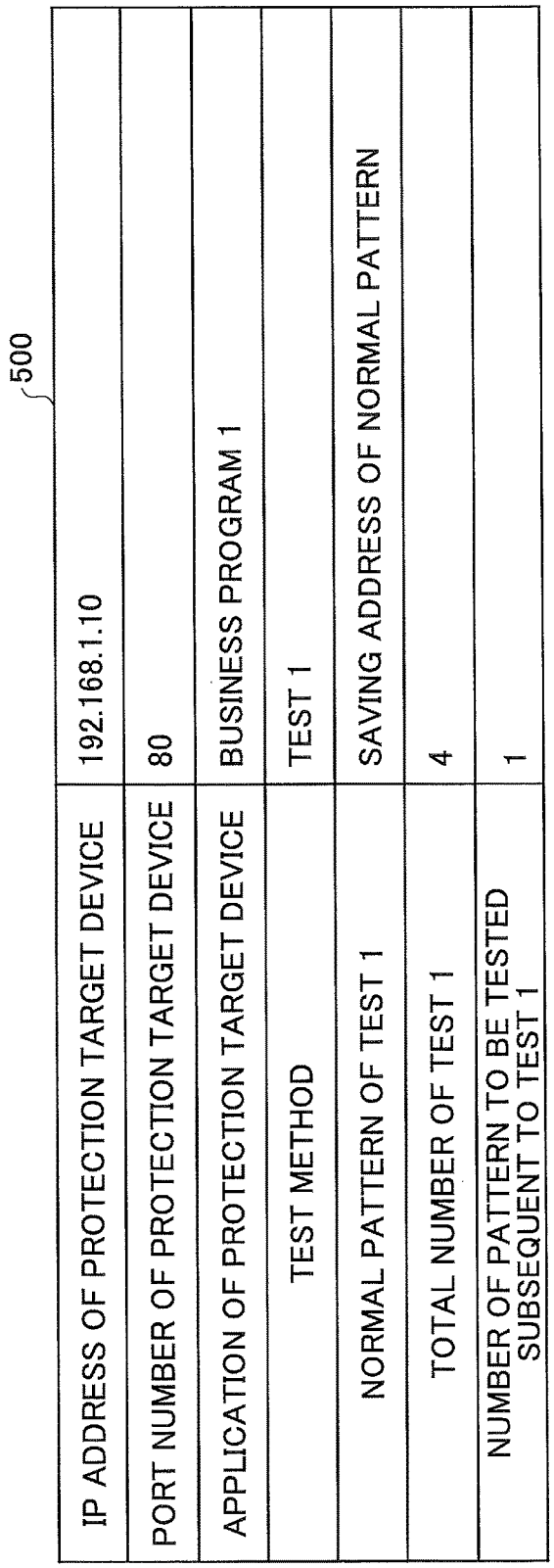
FIG. 5 is an illustration of a list used for creating a pattern.

FIG. 5 illustrates a list 500 used for creating a pattern. The information illustrated in FIG. 5 may be stored in, for example, the vulnerability detecting part 140. For example, the following information may be saved in the list 500.

It is assumed that the following information is previously saved in the test information saving means.

(1) IP address of the protection target device 110: 192.168.1.10
(2) Port number of the protection target device 110: 80
(3) Test method: test 1
(4) Target application of the protection target device 110: business program
(5) Normal pattern of test 1: saved address of the normal pattern
(6) Total number of test patterns of test 1: 4
(7) Number of pattern to be tested subsequent to test 1: 1

In the above item (1), information indicating an address of the protection target device 110, which is a destination of the transmission of the pattern transmitted by the transmitting part 144, may be saved. In the above item (2), a port number of the protection target device 110 may be specified. This is because the vulnerability differs depending on the port number of the protection target device 110. In the above item (3), information specifying the test method may be stored. Here, "test 1" is saved, and, for example, "test 1" indicates that it is a test regarding the above-mentioned buffer overflow. Then, for example, it may be identified that "test 2" is a test for rewriting the name of the header. In the above item (4), information specifying the application to be tested, which is operating in the protection target device 110, may be saved. The reason for using this item is that it is assumed that there may be a case where the vulnerability differs for each application being operated. The above item (5) is an item for specifying the normal pattern of test 1. For example, the normal pattern may be identified by an address at which the normal pattern is stored. The above item (6) indicates a total number of test patterns of test 1. This information may be used when the process of step 410 illustrated in FIG. 4 is performed. The above item (7) may be used when the process of step 410 illustrated in FIG. 4 is performed. By incrementing the value of item (7), a pattern of a subsequent test can be created. In FIG. 5, the value of item (7) is the initial value "1", which indicates that test 1 has not been performed yet.

FIG. 6 illustrates an example of a list 600 to save the pattern in which an abnormality is found. In FIG. 6, "test number" is a number incremented from 1, and may be used to specify the location of an entry. "test method" can be used as information indicating by which test the abnormality was found. "normal pattern of test 1" may be used when it is desired to check the normal pattern. In "pattern information of test 1", an address of the pattern that caused the abnormality may be stored. Alternatively, the sequence number given to the pattern may be saved to specify the pattern. The list 600 can be stored in the pattern saving part 132.

Figure 7:
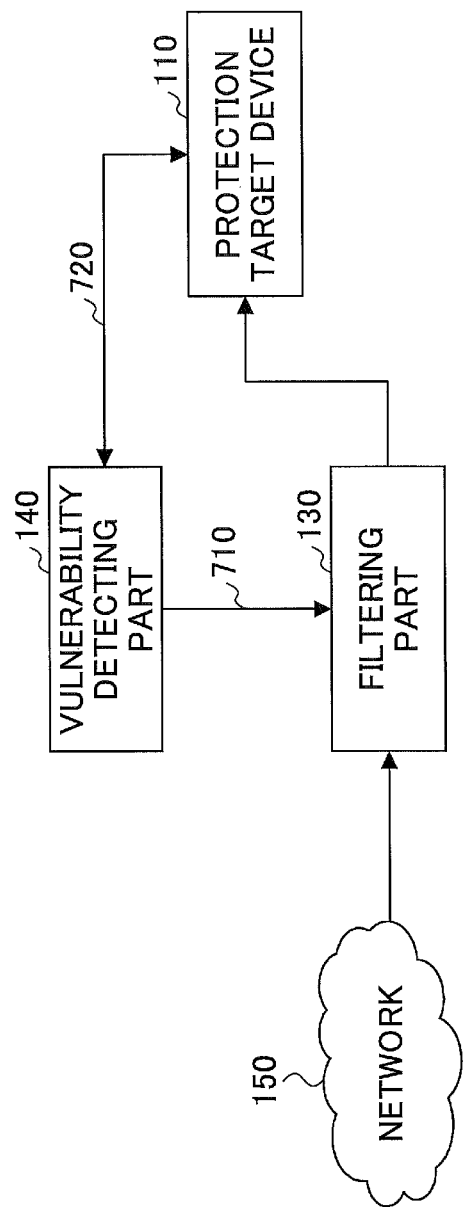
FIG. 7 is a block diagram of a system according to another embodiment.

FIG. 7 illustrates a system according to another embodiment. The vulnerability detecting part 140 is connected to the protection target device 110 by a transmission path 720. In this case, because the vulnerability detecting part 140 is connected to the protection target device 110, if, for example, the protection target device 110 is a server, it is possible to cause the occurrence of system down. Thus, it is desirable to perform the test for vulnerability by activating the vulnerability detecting part 140 when performing a system maintenance of the protection target device 110. Alternatively, if the protection target device 110 is capable of being reactivated quickly, the vulnerability detecting part 140 may be activated during the operation of the protection target device 110. In the present embodiment, because protection target device 110 can be checked directly, the test device 120 for assuming the behavior of the protection target device 110 is not necessarily provided. Additionally, a more accurate checking of vulnerability can be performed than the case of using the test device 120. The pattern identified by the vulnerability detecting part 140 can be transmitted to the filtering part 130 through a transmission path 710.

Figure 8:
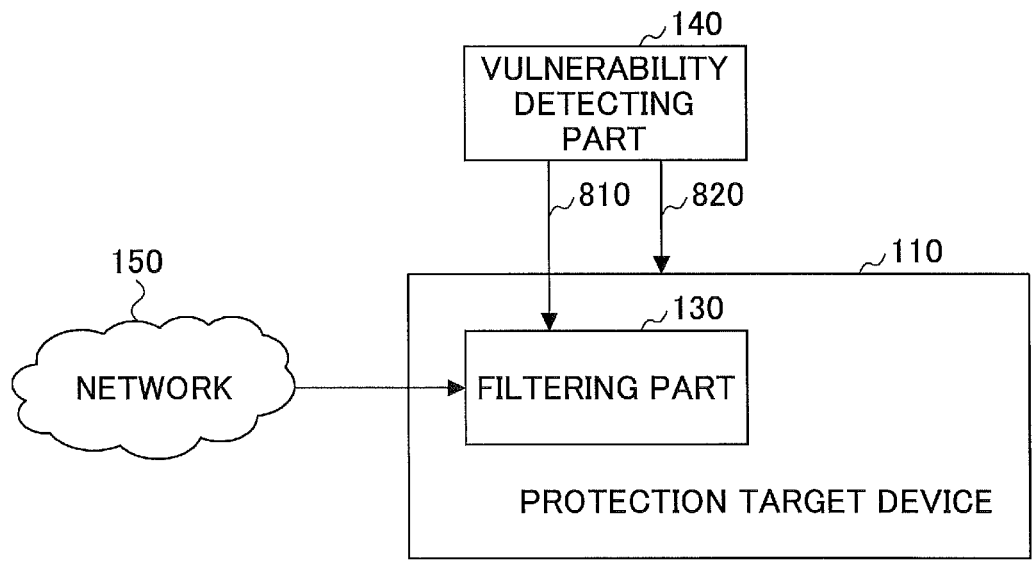
FIG. 8 is a block diagram of a system according to a further embodiment.

FIG. 8 is an illustration of a system according to a further embodiment. In this embodiment, the filtering part 130 is incorporated in the protection target device 110. The filtering part 130 can be installed in the front end part in the protection target device 110. Accordingly, an operation of the filtering by the filtering part 130 can be customized for each protection target device 110. Thus, more appropriate measures can be taken for the vulnerability of the protection target device 110. Although the vulnerability detecting pat 140 is connected to the protection target device 110 through a transmission path 820 in the case of FIG. 8, the test device 120 may be installed separately in the system illustrated in FIG. 8 (not illustrated in the figure). The pattern identified by the vulnerability detecting part 140 is transmitted to the filtering part 130 through a transmission path 810.

Figure 9:
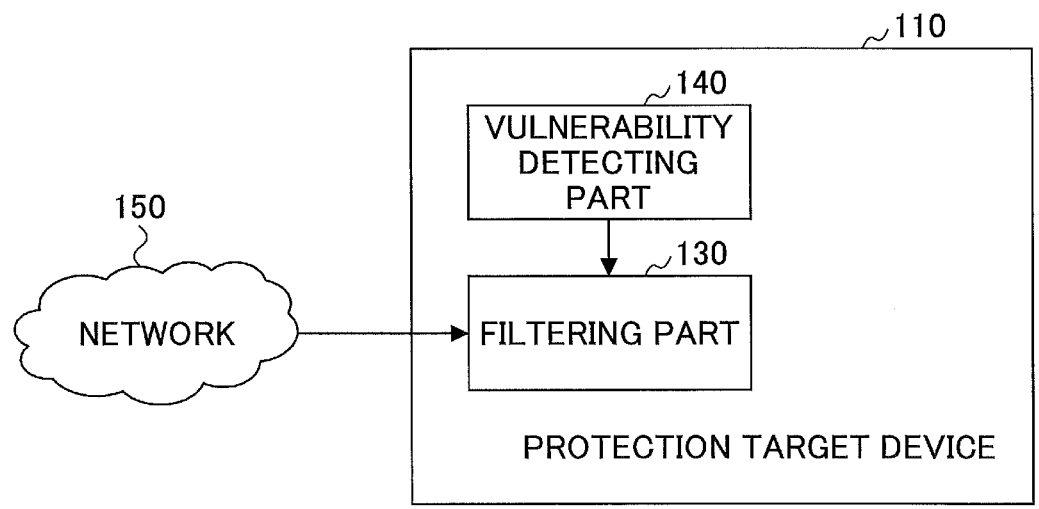
FIG. 9 is a block diagram of a system according to yet another embodiment.

FIG. 9 illustrates a system according to yet another embodiment. The vulnerability detecting device 140 and the filtering part 130 are provided in the protection target device 110. In the present embodiment, it is estimated that an abnormal operation of the protection target device 110 gives influences to the operation of the vulnerability detecting part 140 because the vulnerability detecting part 140 exists in the protection target device 110. Accordingly, there may be a case where the abnormal operation of the protection target device 110 gives influences to the pattern identification or pattern specification by the protection target device 110. In order to take measures for such a situation, a plurality of virtual machines may be operated with respect the same server so that the vulnerability detecting part 140 and the protection target device 110 are operated on different vertical machines. According to such a structure, influences of the abnormal operation of the protection target device given to the pattern identification or pattern specification by the protection target device 110 can be greatly reduced.

Figure 10:
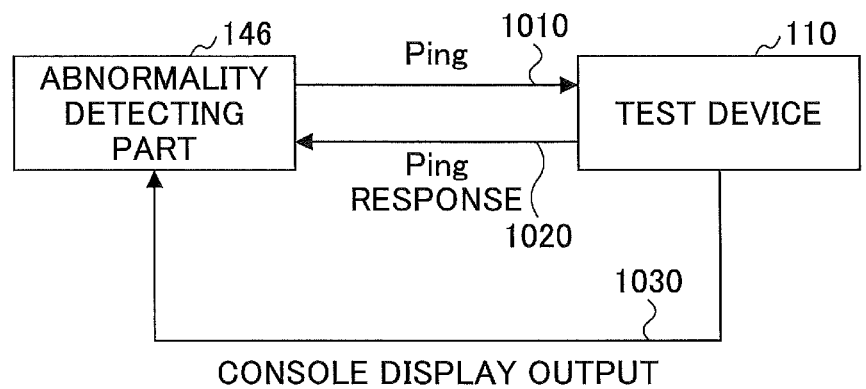
FIG. 10 is a block diagram for explaining an operation of an abnormality detecting part.

FIG. 10 is a block diagram for explaining the above-mentioned abnormality detecting part 146. For example, if the test device 120 is a server, there may be a case where the test device 120 is equipped with a console port. Accordingly, the console port of the test device 120 may be connected to the abnormality detecting part 146 through a transmission path 1030. The abnormality detecting part 146 can check an occurrence of abnormality in the test device 120 by analyzing the output of the console port of the test device 120. This is because the output from a console port of a server or the like normally includes information indicating an abnormality of the server.

Additionally, as illustrated in FIG. 10, a packet for checking death or alive, such as ping, may be sent from the abnormality detecting part 146 to the test device 120. Then, after a predetermined fixed time, it may be checked whether a return response is made. If the return response cannot be identified, it can be appreciated that there is a very high possibility that the test device 120 is down or hung up. Accordingly, by sending the packet for checking death or alive, it can be checked whether an abnormality occurs in the test device 120. Alternatively, a command for checking s status from the abnormality detecting part 146 to the test device 120 to check the various statuses of the test device 120 to detect the occurrence of abnormality in the test device 120.

It should be noted that the present invention is not limited to the above-mentioned various embodiments.

Figure 11:
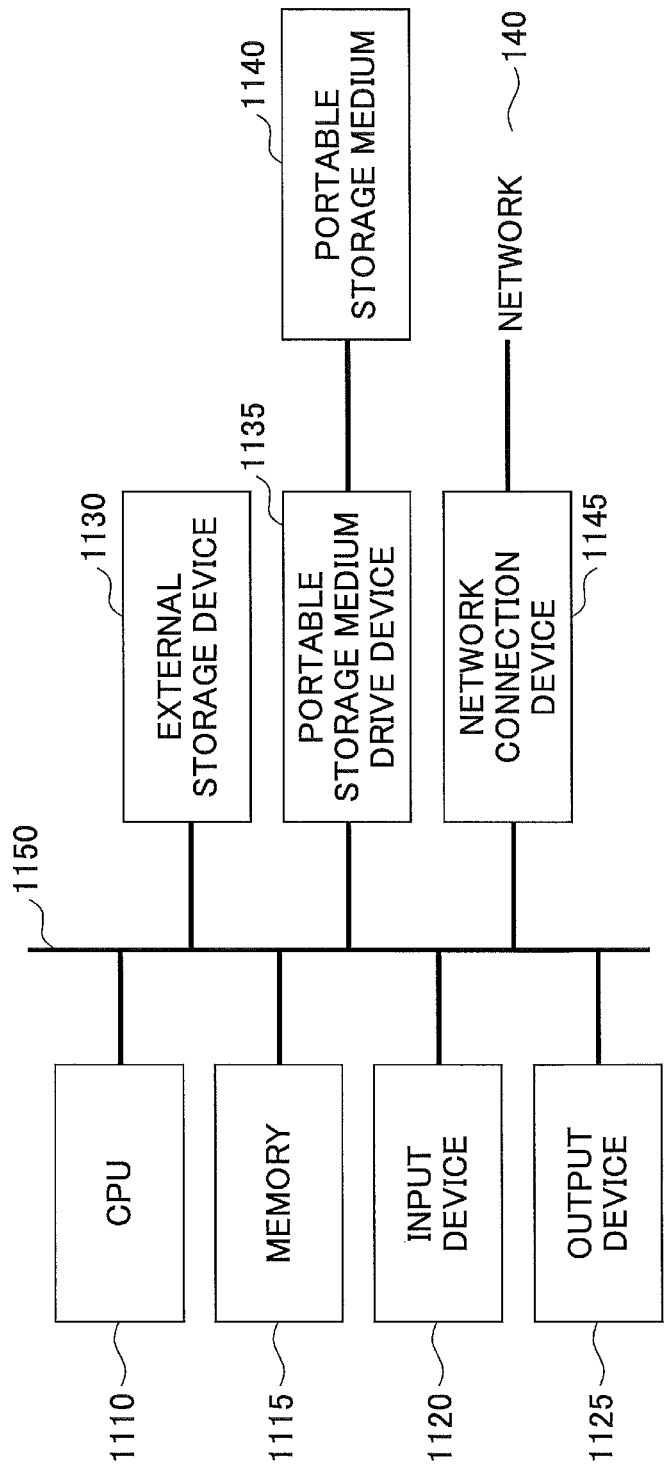
FIG. 11 is a hardware diagram of each of the filtering systems according to the embodiments.

FIG. 11 is a block diagram of a hardware structure (computer) of the system or apparatus according to each of the embodiments. The hardware includes a CPU 1110, memory 1115, input device 1120, output device 1125, external storage device 1130, portable storage medium drive device 1135, and network connection device 1145 that are connected by a bus 1150. The portable storage medium 1135 drive device 1135 is capable of reading and writing a portable storage medium 1140. Additionally, the network connection device 1145 is connected to a network 1160.

All or a part of the embodiments can be implemented by a program. Such a program can be stored in the portable storage medium 1140. The portable storage medium 1140 refers to one or more non-transitory storage medium having a structure. As the portable storage medium 1140, there are, for example, a magnetic recording medium, optical disk, magneto-optical recording medium, non-volatile memory, etc. The magnetic recording medium includes HDD, flexible disk (FD), magnetic tape (MT), etc. The optical disk includes DVD (Digital Versatile Disc), DVD-RAM, CD-ROM (Compact Disc-Read Only Memory), etc. The magnet-optical recording medium includes MO (magneto-optical disk), etc. All or a part of the embodiments of the present invention can be implemented by reading a program stored in the portable recording medium and executing the read program by a processor such as a CPU.

The above-mentioned embodiments are to aid the reader to understand the invention, and do not limit the scope of the present invention. Additionally, the embodiments are not mutually exclusive. Thus, it should be noted that the elements of the different embodiments may be combined in the extent that there is no contradiction. Additionally, in the invention relating to a method and program, the order of processes may be changed to the extent that there is no contradiction, or a plurality of processes may be performed simultaneously. It is needless to say that those embodiments are encompassed in the technical scope of the present invention.

Moreover, the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transitory carrier medium such as an electrical, optical, microwave, acoustic or radio frequency signal carrying the computer code. An example of such a transitory medium is a TCP/IP signal carrying computer code over an IP network, such as the Internet. The carrier medium can also comprise a storage medium for storing processor readable code such as flexible magnetic disk, hard disc, CD-ROM, magnetic tape device or solid state memory device. The computer software can be provided to the programmable apparatus using any non-transitory recording medium for recording processor readable code, such as a flexible magnetic disk, hard disk, CD-ROM, magnetic tape, solid-state memory, etc. The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of CPU can serve as a physical memory or main memory of the apparatus, whereas the HDD can serve as a secondary memory of the apparatus.

Moreover, the structural elements of each of the embodiments may be materialized by a plurality of physically separated hardware components, or may be materialized by being distributed into a plurality of virtual machines that operates on a single server.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus configured to filter data received through a network and output the data to a protection target device that is to be protected, the apparatus comprising:
 a processor to execute a process including:
  comparing the received data with a predetermined pattern that includes information specifying an application of the protection target device that uses the received data, and outputting a result of comparison, the predetermined pattern being one of a plurality of patterns that are given to a test device that is configured to estimate a behavior of the protection target device and exhibits a predetermined behavior to the predetermined pattern, the protection target device and the test device being physically separate from each other and connectable to the apparatus; and
  intercepting the received data when the result of comparison is a positive result that indicates intercepting the data,
 wherein the predetermined pattern is provided by a vulnerability detecting process that includes
  creating data of the plurality of patterns;
  transmitting the created data of each of the plurality of patterns to the test device;
  detecting an abnormality in a behavior of the test device; and
  specifying the predetermined pattern that causes the abnormality in the behavior of the test device when the abnormality in the behavior of the test device is detected.

2. The apparatus as claimed in claim 1, wherein the comparing outputs the positive result when the received data is similar to the predetermined pattern.

3. The apparatus as claimed in claim 1, wherein the protection target device and the test device have identical specifications.

4. The apparatus as claimed in claim 1, wherein the predetermined pattern includes a port number of the protection target device.

5. A non-transitory computer-readable storage medium having stored therein a program for causing a computer to execute a process of filtering data received through a network and outputting the data to a protection target device that is to be protected, the process comprising:
 comparing the received data with a predetermined pattern that includes information specifying an application of the protection target device that uses the received data, and outputting a result of comparison, the predetermined pattern being one of a plurality of patterns that are given to a test device that is configured to estimate a behavior of the protection target device and exhibits a predetermined behavior to the predetermined pattern, the protection target device and the test device being physically separate from each other and connectable to the computer;
 intercepting the received data when the result of comparison is a positive result that indicates intercepting the data;
 creating data of the plurality of patterns;
 giving the created data of each of the plurality of patterns to the test device;
 detecting an abnormality in a behavior of the test device; and
 specifying the predetermined pattern that causes the abnormality in the behavior of the test device when the abnormality in the behavior of the test device is detected by the detecting.

6. The non-transitory computer-readable storage medium as claimed in claim 5, wherein the outputting a result of comparison includes outputting the positive result when the received data is similar to the predetermined pattern.

7. The non-transitory computer-readable storage medium as claimed in claim 5, wherein the protection target device and the test device have identical specifications.

8. The non-transitory computer-readable storage medium as claimed in claim 5, wherein the predetermined pattern includes a port number of the protection target device.

9. A method of filtering data received through a network and outputting the data to a protection target device that is to be protected, by a computer that performs a process comprising:
 comparing the received data with a predetermined pattern that includes information specifying an application of the protection target device that uses the received data, and outputting a result of comparison, the predetermined pattern being one of a plurality of patterns that are given to a test device configured to estimate a behavior of the protection target device and exhibits a predetermined behavior to the predetermined pattern, the protection target device and the test device being physically separate from each other and connectable to the computer;
 intercepting the received data when the result of comparison is a positive result that indicates intercepting the data;
 creating data of the plurality of patterns;
 giving the created data of each of the plurality of patterns to the test device;
 detecting an abnormality in a behavior of the test device; and
 specifying the predetermined pattern that causes the abnormality in the behavior of the test device when the abnormality in the behavior of the test device is detected by the detecting.

10. The method as claimed in claim 9, wherein the outputting the result of comparison includes outputting the positive result when the received data is similar to the predetermined pattern.

11. The method as claimed in claim 9, wherein the protection target device and the test device have identical specifications.

12. The method as claimed in claim 9, wherein the predetermined pattern includes a port number of the protection target device.

13. A system configured to filter data received through a network and output the data to a protection target device that is to be protected, the system comprising:
 one or more processors to execute a process including:
  creating data of a plurality of patterns;
  transmitting the created data of each of the plurality of patterns to a test device that is configured to estimate a behavior of the protection target device and exhibits a predetermined behavior to a predetermined pattern, the protection target device and the test device being physically separate from each other and connectable to the system;
  detecting an abnormality in a behavior of the test device;
  specifying the predetermined pattern that causes the abnormality in the behavior of the test device when the abnormality in the behavior of the test device is detected by the detecting, the predetermined pattern including information specifying an application of the protection target device that uses the received data;

outputting a result of comparing the received data with the predetermined pattern; and intercepting the received data when the result of comparing is a positive result that indicates intercepting the data.

14. The apparatus as claimed in claim 1, wherein the information included in the predetermined pattern specifies the application that is to be tested and operates in the protection target device that uses the received data.

15. The non-transitory computer-readable storage medium as claimed in claim 5, wherein the information included in the predetermined pattern specifies the application that is to be tested and operates in the protection target device that uses the received data.

16. The method as claimed in claim 9, wherein the information included in the predetermined pattern specifies the application that is to be tested and operates in the protection target device that uses the received data.

17. The system as claimed in claim 13, wherein the information included in the predetermined pattern specifies the application that is to be tested and operates in the protection target device that uses the received data.

* * * * *